United States Patent
Verhaeghe et al.

(10) Patent No.: US 10,055,680 B2
(45) Date of Patent: Aug. 21, 2018

(54) ANTENNA FOR USE IN AN RFID TAG

(71) Applicant: NV Bekaert SA, Zwevegem (BE)

(72) Inventors: Tom Verhaeghe, Vichte (BE); Steven Dillien, Ghent (BE); Kristof Degroote, Kortrijk (BE); Dominique Andries, Oudenaarde (BE)

(73) Assignee: NV BEKAERT SA, Zwevegem (BE)

( * ) Notice: Subject to any disclaimer, the term of this patent is extended or adjusted under 35 U.S.C. 154(b) by 0 days.

(21) Appl. No.: 15/565,999

(22) PCT Filed: May 13, 2016

(86) PCT No.: PCT/EP2016/060879
§ 371 (c)(1),
(2) Date: Oct. 12, 2017

(87) PCT Pub. No.: WO2016/192963
PCT Pub. Date: Dec. 8, 2016

(65) Prior Publication Data
US 2018/0114107 A1 Apr. 26, 2018

(30) Foreign Application Priority Data
Jun. 2, 2015 (EP) .................................... 15170280

(51) Int. Cl.
*G06K 19/077* (2006.01)
*H01Q 1/27* (2006.01)
*H01Q 1/22* (2006.01)

(52) U.S. Cl.
CPC ..... *G06K 19/07773* (2013.01); *H01Q 1/2208* (2013.01); *H01Q 1/273* (2013.01)

(58) Field of Classification Search
CPC ....... G06K 19/07773; G06K 19/07777; G06K 19/0779; G06K 19/07792; H01Q 1/273; H01Q 1/276; H01Q 1/2208; H01Q 1/2216; B82Y 30/00; B82Y 35/00; C04B 35/62836; C04B 35/62839; C04B 35/62842; C04B 35/62894

See application file for complete search history.

(56) References Cited

U.S. PATENT DOCUMENTS

| 2,050,298 | A | 8/1936 | Everett | |
|---|---|---|---|---|
| 6,953,619 | B2* | 10/2005 | Dean | C08L 101/12 29/600 |
| 8,168,570 | B2* | 5/2012 | Barron | B01J 13/02 428/357 |
| 9,803,135 | B2* | 10/2017 | Barron | C09K 8/80 |
| 9,823,737 | B2* | 11/2017 | Mazed | G06F 3/011 |

FOREIGN PATENT DOCUMENTS

| EP | 2 784 724 | 10/2014 |
|---|---|---|
| WO | 2014/204322 | 12/2014 |

OTHER PUBLICATIONS

International Search Report dated Aug. 24, 2016 in International (PCT) Application No. PCT/EP2016/060879.

* cited by examiner

*Primary Examiner* — Van Trieu
(74) *Attorney, Agent, or Firm* — Wenderoth, Lind & Ponack, L.L.P.

(57) ABSTRACT

An antenna for use in an RFID tag comprises a yarn. The yarn comprises stainless steel fibers or the RFID-antenna comprises a stainless steel wire. The stainless steel fibers or the stainless steel wire have a martensite percentage by weight less than 5%.

20 Claims, 1 Drawing Sheet

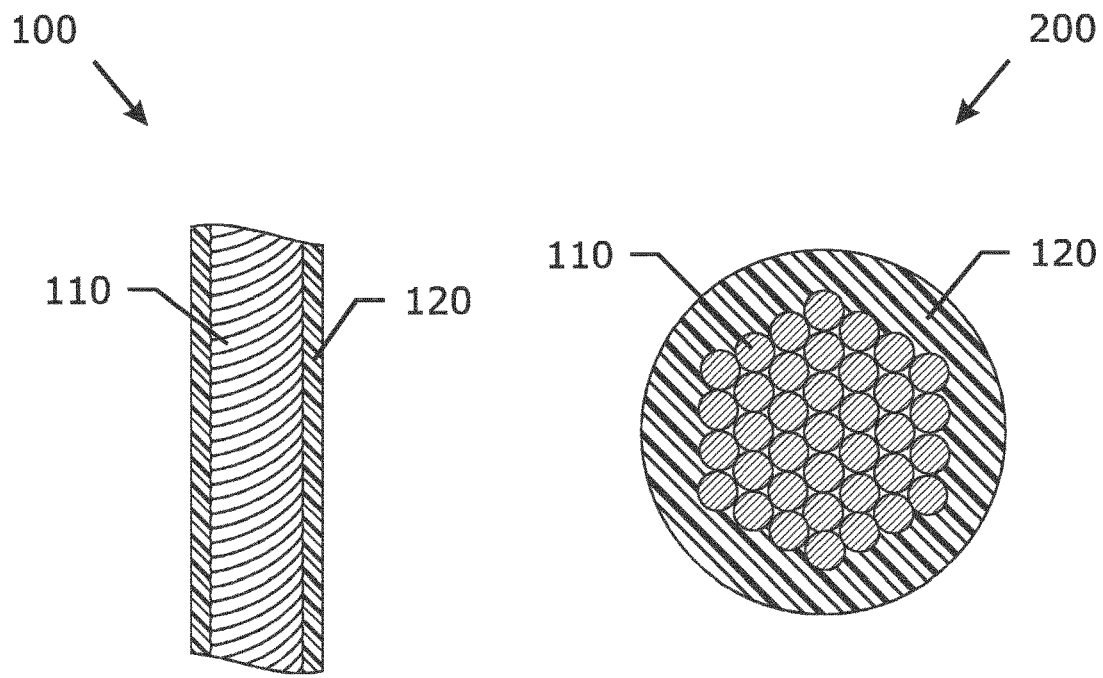
Fig. 1
Fig. 2
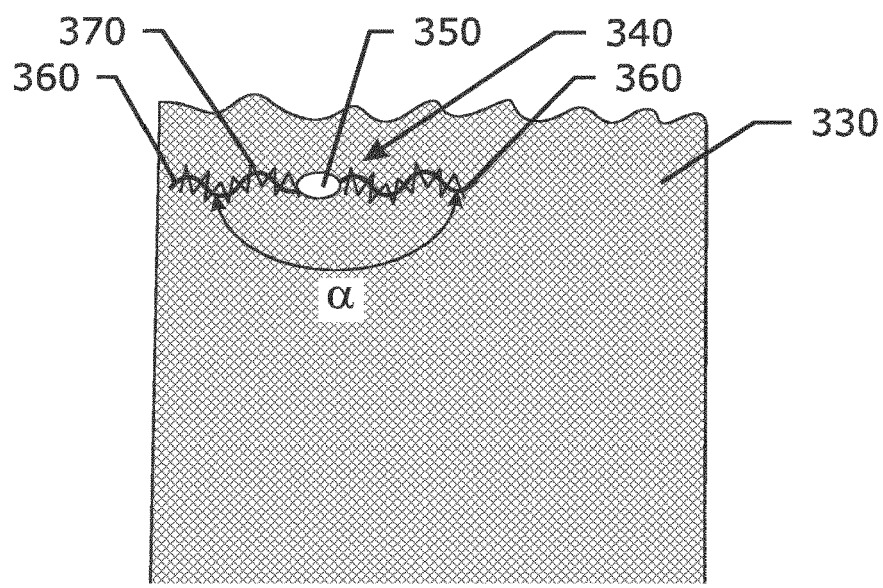
Fig. 3

ANTENNA FOR USE IN AN RFID TAG

TECHNICAL FIELD

The invention relates to the field of antennas suitable for use in RFID (Radio Frequency Identification) tags. The invention further relates to RFID tags, such as can be attached to laundry items—for instance clothing and bed sheets—used in hospitals.

BACKGROUND ART

WO2014/204322A1 discloses an RFID tag particularly suitable for use as linen or laundry tag. The RFID tag in a specific embodiment comprises a backing layer, a first adhesive layer overlaying the backing layer, an RFID transponder and antenna overlaying the first adhesive layer, and a second adhesive layer overlaying the RFID transponder and antenna. The layers are laminated together, hermetically sealing the RFID transponder and antenna within the RFID tag. In a preferred embodiment, the antenna comprises an elongate multi-strand stainless steel wire, e.g. having 49 strands. The wire is preferably between 0.3 and 0.5 mm in diameter, and encapsulated in a nylon or other polymer insulation. Such a multi-strand wire structure measuring 0.3-0.5 mm in diameter with 49 strands has been found to have sufficient flexibility and be less prone to kinking than prior art antennas. The antenna can be stitched to a reinforced adhesive layer prior to lamination. The stitching may comprise a cotton, polyester-cotton, or other substantially durable thread, and preferably holds the antenna in position during lamination and, in combination with the reinforced adhesive layer, subsequent use of the RFID tag.

DISCLOSURE OF INVENTION

It is an objective of the invention to provide an improved RFID antenna for application on textile fabrics that are used inside or in the neighbourhood of medical devices such as MRI-scanners. It is a specific objective of the invention to provide RFID antennas for application on textile fabrics and in which the RFID antenna does not significantly affect the resulting medical image of medical devices such as MRI-scanners. It is a further objective to provide an RFID antenna that can be used in combination with an RFID tag and can be attached to laundry items such as gowns and bed sheets used in hospitals.

The first aspect of the invention is an antenna for use in an RFID tag. The antenna comprises a yarn wherein the yarn comprises stainless steel fibers, or the RFID-antenna comprises a stainless steel wire. With stainless steel is meant a steel grade comprising at least 10.5% by weight of chromium. The stainless steel fibers or the stainless steel wire have a martensite percentage by weight less than 5%, preferably less than 3%, more preferably less than 2%, more preferably less than 1%, more preferably below 0.35%, more preferably below 0.25%, more preferably below 0.1%. Even more preferably, the stainless steel wire or the stainless steel fibers are free from martensite.

The prior art describes the use of stainless steel wire antennas for RFID tags. Stainless steel wires have an end drawn microstructure. An end drawn microstructure is a microstructure characterized by substantially non-equiaxed grains. By drawing stainless steel wire (or stainless steel fibers) the wire or fibers comprise a considerable amount of martensite, typically the martensite content ranges between 10 and 80% by weight of the stainless steel.

It is a surprising benefit of the invention that—contrary to the prior art antennas—the RFID-antenna of the invention does not interfere with medical devices, such as MRI-scanners. Consequently, the RFID-antenna according to the invention can be used e.g. for RFID-chips on apparel products or bed sheets that are used in hospitals in or around MRI-scanners, without disturbing the medical images obtained by the medical devices.

Martensite in stainless steel fibers or in a stainless steel wire can be determined by means of optical microscopic observation of the stainless steel after etching with appropriate etching chemicals. Alternatively, presence and quantity of martensite in stainless steel can be determined by means of X-ray diffraction (XRD). An alternative method is measuring the saturation field via magnetic measurement, after which the weight percentage of the tested stainless steel sample can be calculated via comparison with the measurement value for 100% martensitic stainless steel.

Preferably, the stainless steel fibers or the stainless steel wire in the antenna have an annealed microstructure. An annealed microstructure is a recrystallized microstructure which comprises substantially equiaxed grains. Annealing can be performed by a heat treatment process wherein the stainless steel is heated to above its recrystallization temperature, maintaining a suitable temperature during a certain period of time, and then cooling. The annealing process removes martensite formed during drawing of the stainless steel wires or of the stainless steel fibers and recrystallizes the stainless steel, resulting in substantially equiaxed grains.

It is also possible to obtain the low martensite or martensite free stainless steel wires or stainless steel fibers for the invention by annealing during a sufficient time period at temperatures below the recrystallization temperature. Martensite is then converted into austenite without a complete recrystallization of the microstructure.

The stainless steel fibers or the stainless steel wire can be made out of stainless steel of the 300 alloy series or of the 200 alloy series according to ASTM A240 (and more specifically according to ASTM A240/A240M-15a, Standard Specification for Chromium and Chromium-Nickel Stainless Steel Plate, Sheet, and Strip for Pressure Vessels and for General Applications, ASTM International, West Conshohocken, Pa., 2015), e.g. alloy 316 or alloy 316L. Preferably, the stainless steel fibers or the stainless steel wire are made out of an alloy comprising at least 12% by weight of nickel.

More preferably, the stainless steel fibers or the stainless steel wire are made out of an alloy comprising at least 12% by weight of nickel and at least 16% by weight of chromium; and preferably between 2 and 2.5% by weight of molybdenum.

Even more preferred is an alloy that has the same specification as alloy 316L (according to ASTM A240/A240M-15a) but with modified nickel content (between 12 and 15% by weight), modified chromium content (between 17 and 18% by weight) and modified molybdenum content (between 2 and 2.5% by weight).

Preferably the antenna comprises stainless steel fibers or a stainless steel wire comprising or made out of a stainless steel alloy comprising between 12 and 15% by weight of nickel, between 17 and 18% by weight of chromium, between 2 and 2.5% by weight of molybdenum, less than 0.03% by weight of carbon and less than 0.1% by weight of nitrogen. Such alloy is preferred because of its low amount of martensite in the end-drawn microstructure of bundle drawn fibers and drawn wires.

Preferably, the stainless steel fibers or the stainless steel wire comprise or are made out of a high nitrogen austenitic stainless steel (HNASS). A high nitrogen austenitic stainless steel alloy is a stainless steel alloy comprising nitrogen content of more than 0.4% by weight. HNASS steel grades stay fully austenitic during the wire drawing or bundled fiber drawing process; no strain induced martensite is formed during the drawing process.

A first example of a HNASS steel grade that can be used in the invention comprises 0.2% by weight of carbon, 17% by weight of chromium, 0.05% by weight of nickel, 0.53% by weight of nitrogen, 3.3% by weight of molybdenum and 10.50% by weight of manganese.

A second example of a HNASS steel grade that can be used in the invention comprises 0.08% by weight of carbon, 21% by weight of chromium, 0.3% by weight of nickel, 1% by weight of nitrogen, 0.7% by weight of molybdenum and 23% by weight of manganese.

Preferably, the antenna comprises a yarn wherein the yarn comprises stainless steel fibers. The stainless steel fibers can be present in the yarn as filaments; or the stainless steel fibers can be present in the yarn as fibers of discrete length. With filaments is meant stainless steel fibers of virtually infinite length. A yarn comprising stainless steel filaments can be provided as a bundle of twisted parallel filaments, or as multiply (e.g. a two-ply) twisted or cabled yarn.

With fibers of discrete length is meant that the fibers have a finite length and in most cases a length distribution. Yarns out of fibers with discrete length are made by means of a yarn spinning process, e.g. ring spinning. Yarns out of fibers with discrete length can be single ply yarns, or multiply (e.g. two ply) yarns.

Stainless steel fibers for use in the invention, whether filaments or fibers of discrete length, can be made according to the bundled drawing method, as is e.g. described in U.S. Pat. No. 2,050,298. Such fibers have a characteristic polygonal cross-section. Preferably, bundle drawn stainless steel fibers for use in the invention have an equivalent diameter of more than 4 µm, preferably of more than 10 µm; and preferably less than 30 µm, more preferably less than 20 µm; more preferably less than 15 µm. The equivalent diameter of a fiber of non-circular cross section is the diameter of a circle with the same area as the area of the cross section of the fiber that has a non-circular cross section.

It is also possible to use in the invention single end drawn stainless steel filaments. Such filaments have in most cases a round cross section. Preferred are single end drawn stainless steel filaments with cross section more than 40 µm and preferably less than 100 µm, e.g. 50 µm, 60 µm or 80 µm. An example is a yarn consisting out of 24 stainless steel filaments of 50 µm diameter twisted together with 100 turns per meter.

Preferably, the antenna comprises a yarn, wherein the yarn comprises stainless steel fibers. The yarn can be a twisted stainless steel multifilament yarn (meaning a yarn comprising a multitude of stainless steel filaments), preferably with twist less than 200 turns per meter, more preferably with twist less than 150 turns per meter.

Preferably, the antenna comprises a yarn, wherein the yarn comprises stainless steel fibers; and the linear density of the yarn is less than 350 tex, more preferably less than 250 tex. The linear density of the yarn is determined taking only the stainless steel fibers into account; the possible presence of a coating layer on the yarn is not taken into account for the determination of the linear density of the yarn.

For durability purposes (e.g. to withstand multiple laundry processes), the yarn or the stainless steel wire of preferred antennas can be coated with a polymer coating, preferably with a polymer coating comprising fluorine in the polymer, e.g. PFA (perfluoroalcoxy polymer); or with a thermoplastic elastomer (TPE) coating.

The second aspect of the invention is an RFID tag comprising a transponder and an antenna as in the first aspect of the invention. The antenna is coupled to the transponder.

Preferably, the RFID tag comprises a transponder and two antennas as in the first aspect of the invention. The two antennas are each coupled to the transponder. Preferably, the included angle between the two antennas is 180°.

A third aspect of the invention is an assembly of a textile fabric and an RFID tag as in the second aspect of the invention. The RFID tag is fixed onto the textile fabric.

Preferably, the antenna is fixed onto the textile fabric, so that the antenna undulates on the textile fabric.

Preferably, the antenna is fixed onto the textile fabric by means of one or by means of more than one stitching yarns.

A fourth aspect of the invention is an apparel product, e.g. a gown, or a bed sheet comprising an assembly as in the third aspect of the invention.

BRIEF DESCRIPTION OF FIGURES IN THE DRAWINGS

FIG. 1 shows an example of an RFID-antenna according to the invention.

FIG. 2 shows a cross section of an RFID-antenna according to the invention.

FIG. 3 shows a textile fabric and an RFID tag fixed onto the textile fabric.

MODE(S) FOR CARRYING OUT THE INVENTION

FIG. 1 shows the longitudinal view of an exemplary RFID-antenna 100. FIG. 2 shows the cross section 200 of the exemplary RFID-antenna. The exemplary RFID-antenna has been made using bundle drawn stainless steel filaments of 12 µm equivalent diameter out of 316L stainless steel (according to ASTM A240). The stainless steel filaments have been annealed at 1000° C. to create the annealed microstructure of the stainless steel filaments. A parallel bundle of 275 stainless steel filaments 110 has been twisted with 100 turns per meter in order to obtain a twisted yarn. The twisted yarn has been coated with PFA, to create a PFA (perfluoroalcoxy polymer) coating layer 120 on the antenna 100. The antenna was virtually free of martensite, as determined by measuring the saturation field via magnetic measurement, and comparison with the measurement value of stainless steel samples with known martensite weight percentage to calculate the martensite weight percentage of the tested sample.

As an alternative to the twisted stainless steel multifilament yarn, a stainless steel wire annealed to an annealed microstructure (to obtain the low martensite or martensite free microstructure) can be used as antenna.

FIG. 3 shows a textile fabric 330 and an RFID tag 340 fixed onto the textile fabric. The RFID tag 340 comprises a transponder 350 and two antennas 360 as in the first aspect of the invention, e.g. the antenna as described in the example. The two antennas 360 are coupled to the transponder 350. The RFID tag 340 is fixed onto the textile fabric. The antennas 360 are positioned onto the textile fabric 330, so that the antennas 360 undulate on the textile fabric 330. The included angle α between the two antennas 360 equals 180°. The antennas 360 are fixed onto the textile fabric 330 by means of one or more than one stitching yarns 370.

The textile fabric with the exemplary RFID tag with the antennas as described in the example has been tested on the effect on MRI-scanner images. The effect was sufficiently low such that it did not affect the MRI images negatively.

The invention claimed is:

1. Antenna for use in an RFID tag,
wherein the antenna comprises a yarn, wherein the yarn comprises stainless steel fibers, or wherein the RFID-antenna comprises a stainless steel wire;
and wherein the stainless steel fibers or the stainless steel wire have a martensite percentage by weight less than 5%.

2. Antenna as in claim 1, wherein the stainless steel fibers or the stainless steel wire have an annealed microstructure.

3. Antenna as in claim 2, wherein the stainless steel fibers or the stainless steel wire comprise or are made out of a stainless steel alloy comprising between 12 and 15% by weight of nickel, between 17 and 18% by weight of chromium, between 2 and 2.5% by weight of molybdenum, less than 0.03% by weight of carbon and less than 0.1% by weight of nitrogen.

4. Antenna as in claim 2, wherein the stainless steel fibers or the stainless steel wire are made out of a high nitrogen austenitic steel alloy.

5. Antenna as in claim 1, wherein the stainless steel fibers or the stainless steel wire are made out of stainless steel of the 300 series or of the 200 series according to ASTM A240.

6. Antenna as in claim 1, wherein the stainless steel fibers or the stainless steel wire comprise or are made out of a stainless steel alloy comprising between 12 and 15% by weight of nickel, between 17 and 18% by weight of chromium, between 2 and 2.5% by weight of molybdenum, less than 0.03% by weight of carbon and less than 0.1% by weight of nitrogen.

7. Antenna as in claim 1, wherein the stainless steel fibers or the stainless steel wire are made out of a high nitrogen austenitic steel alloy.

8. Antenna as in claim 1, wherein the antenna comprises a yarn, wherein the yarn comprises stainless steel fibers; and wherein the stainless steel fibers are present as filaments;
or wherein the stainless steel fibers are present as fibers of discrete length.

9. Antenna as in claim 1, wherein the antenna comprises a yarn, wherein the yarn comprises stainless steel fibers; wherein the stainless steel fibers are present as filaments;
and wherein the yarn is a twisted multifilament yarn with twist less than 200 turns per meter.

10. Antenna as in claim 1, wherein the antenna comprises a yarn wherein the yarn comprises stainless steel fibers; and wherein the linear density of the yarn is less than 350 tex.

11. Antenna as in claim 1, wherein the yarn or the stainless steel wire is coated with a polymer coating.

12. RFID tag comprising a transponder and an antenna as in claim 1, wherein the antenna is coupled to the transponder.

13. RFID tag as in claim 12, wherein the RFID tag comprises a transponder and two antennas as in claim 1; and wherein the two antennas are each coupled to the transponder.

14. Assembly of a textile fabric and an RFID tag as in claim 13, wherein the RFID tag is fixed onto the textile fabric.

15. Assembly of a textile fabric and an RFID tag as in claim 12, wherein the RFID tag is fixed onto the textile fabric.

16. Assembly as in claim 15, wherein the antenna is fixed onto the textile fabric so that the antenna undulates on the textile fabric.

17. Assembly as in claim 16, wherein the antenna is fixed onto the textile fabric by means of one or by means of more than one stitching yarns.

18. Apparel product or bed sheet comprising an assembly as in claim 16.

19. Assembly as in claim 15, wherein the antenna is fixed onto the textile fabric by means of one or by means of more than one stitching yarns.

20. Apparel product or bed sheet comprising an assembly as in claim 15.

* * * * *